United States Patent
Ariyoshi et al.

(10) Patent No.: US 6,256,341 B1
(45) Date of Patent: Jul. 3, 2001

(54) SPREAD SPECTRUM RECEIVER USING DIGITAL MATCHED FILTER

(75) Inventors: Masayuki Ariyoshi, Mitaka; Takashi Yano, Tokorozawa; Takaki Uta, Yokohama; Nobukazu Doi, Hachioji, all of (JP)

(73) Assignee: Htachi, Ltd., Tokyo (JP)

( * ) Notice: Subject to any disclaimer, the term of this patent is extended or adjusted under 35 U.S.C. 154(b) by 0 days.

(21) Appl. No.: 09/124,233

(22) Filed: Jul. 29, 1998

(30) Foreign Application Priority Data

Jul. 31, 1997 (JP) .................................................. 9-205774

(51) Int. Cl.$^7$ ...................................................... H04K 1/00
(52) U.S. Cl. ........................... 375/152; 375/143; 375/367
(58) Field of Search .................................... 375/130, 140, 375/142, 143, 150, 151, 152, 153, 229, 367; 370/320, 324, 335, 342

(56) References Cited

U.S. PATENT DOCUMENTS

| | | | |
|---|---|---|---|
| 5,022,047 | * 6/1991 | Dixon et al. | 375/151 |
| 5,396,515 | * 3/1995 | Dixon et al. | 375/150 |
| 5,663,983 | * 9/1997 | Lin | 375/512 |
| 5,903,556 | * 5/1999 | Matui | 370/342 |
| 5,903,595 | * 5/1999 | Suzuki | 375/152 |

* cited by examiner

Primary Examiner—Stephen Chin
Assistant Examiner—Chieh M. Fan
(74) Attorney, Agent, or Firm—Antonelli, Terry, Stout & Kraus, LLP

(57) ABSTRACT

A spread spectrum receiver having a smaller circuit scale is accomplished by a circuit construction wherein the number of taps is set to a number smaller than a spread factor, and a cyclic accumulation process for determining a correlation value of one symbol is executed by a circuit construction using an input sequence register block in common with an addition block of a spread spectrum receiver by MF according to the prior art.

11 Claims, 5 Drawing Sheets

SPREAD SPECTRUM RECEIVER USING DIGITAL MATCHED FILTER

BACKGROUND OF THE INVENTION

This invention relates to a communication system using a spread spectrum system. More particularly, the present invention relates to a spread spectrum receiver by means of a digital matched filter used for synchronous acquisition and retention so as to de-spread those signals which are subjected to spectrum spreading modulation and are then transmitted.

To receive spread spectrum signals correlation reception for synchronizing the spreading codes of the reception signals with the spreading codes used for de-spreading and demodulation must be executed. A correlation reception method can be classified broadly into active correlation and passive correlation. It is well known that in comparison with the active correlation, the passive correlation has the advantage that initial synchronization acquisition can be generally completed within a shorter time. A digital matched filter (hereinafter called the "MF") is one of the means for accomplishing the passive correlation method, and has been put into practical application with the progress of the LSI technologies in recent years.

The matched filter preserves an inputted reception sequence over m taps, and executes multiply-add calculation between the reception data of each tap and the spreading code used for de-spreading within one operation clock period. The number of taps m is set to be equal to a spread factor Gp, and a correlation value for one symbol is determined for each operation clock.

FIG. 1 shows the arrangement of a conventional MF accomplished by digital devices as a prior art example (a part of the arrangement of STEL-3340 manufactured by Stanford Telecom Co., for example). This diagram shows an example in which the reception signal Rx(t) sampled at a rate 4 times a chip rate (over-sample ratio k=4), for example, is de-spread by the MF having the number of taps of 64, for example, in a spread spectrum communication system having a spread factor Gp=64, for example. This MF comprises an input signal sequence register block 24 for recording the reception signals, a coefficient register block 20, a multiplication block 21 for multiplying a reception signal by a spreading code, and an addition block 203 for adding the multiplication results of m taps. The input signal sequence register block 24 comprises 256 stages of reception sequence input delay devices 2400 to 2462. The coefficient register block 20 comprises 64 stages of spreading code coefficient registers 22 (2200 to 2263) and 64 stages of spreading code coefficient delay devices 23 (2300 to 2363). The delay time T of each spreading code coefficient delay device 2300 to 2363 corresponds to the time width of one chip of the spreading code while the delay time D of each reception sequence input delay device 2400 to 2462 corresponds to one operation clock time for sampling the reception signal Rx(t). Since sampling is done at the over-sample ratio of k=4 in this case, the relationship T=4×D is established. In the drawing, reference numeral 4D represents that the delay devices having the delay time D are cascaded in four stages. The taps (tap0(t) to tap63(t)) are extended for every four stages of the reception sequence input delay devices 2400 to 2462 so cascaded.

The reception signals Rx(t) are serially inputted to the reception sequence input delay devices 24. Because the delay devices having the delay time D are cascaded in four stages between the adjacent taps, tap0(t), tap1(t), . . . , tap63(t) output the sampled reception signal sequence per chip (time width=T). That is, tap0(t)=Rx(t−252)
tap1(t)=Rx(t−248)
tap2(t)=Rx(t−244) . . .
tap63(t)=Rx(t)

On the other hand, the spreading code sequence (for example, PN(0), PN(4), PN(8), . . . , PN(252)) is inputted to each of the spreading code coefficient registers 22 (C0, C1, C2, . . . , C63). When the cycle of the spreading code sequence in the spread spectrum communication system is 64 chips, the content of each coefficient register 22 is fixed. However, in order to reduce mutual interference between the codes, it is generally preferred to execute spreading by using a spreading code sequence having a longer spreading code length. When de-spreading of a continuous reception signal sequence is executed by using the spreading code having a spreading code length extending between a plurality of symbols (one symbol=64 chips), the content of each coefficient register 22 is updated in the interval of 64 chips (256 operation clocks). More concretely, each of the spreading code coefficient delay devices 2300 to 2363 of the 64th stage shifts its content to the delay device of the next stage for every chip rate (4 operation clocks). At the point of time at which 256 operation clocks pass by, the spreading code sequence held by each of the spreading code coefficient delay devices 2300 to 2363 of the 64th stage is updated to the spreading code sequence of the next symbol and is altogether read into the corresponding one of the spreading code coefficient registers 2200 to 2263 of the 64th stage when the input of a load timing signal Wc is received.

The output from each tap and the corresponding spreading code sequence are multiplied by the corresponding one of the multipliers 2100 to 2163, each product is added by the addition block 203, and a correlation value Corr(t) is outputted. These processes are expressed by the formula given below.

$$Corr(t) = tap0(t) \times C0 + tap1(t) \times C1 + \ldots, tap63(t) \times C63$$

Assuming that the system starts operating at t=0, the correlation value expressed by the following equation can be obtained at t=253 as the de-spreading demodulation result for the first one symbol:

$$Corr(252) = Rx(0) \times PN(0) + Rx(4) \times PN(4) + \ldots, Rx(252) \times PN(252)$$

When t>252, the correlation values acquired by the de-spreading demodulation process at the timings deviated by one sample clock for each operation clock are serially outputted.

As described above, the spread spectrum receiver executes instantaneously the multiply-add calculation of the reception data of each tap and the spreading code, that is, the de-spreading process, and can therefore execute initial synchronization acquisition at a high speed. Because the output can be obtained by isolating the multi-path components in a transfer path at resolution of the sampling rate, the spread spectrum receiver has the advantage that a path search for RAKE reception can be effectively done.

However, when the MF is materialized by the digital devices, an extremely large number of gates such as the digital delay devices, the multipliers and the adders are necessary as already described, and the problem remains in that the circuit scale is very great. Because the reception signal Rx inputted to the delay device 2462 of the initial stage is shifted serially to the delay devices of the subsequent stages, all the gates constituting the input sequence coefficient delay devices 2400 to 2462, the multipliers 2100 to 2163 and the addition block 203 operate for each clock, and another problem develops in that power consumption is extremely great.

Recently, a cellular mobile communication system (IS-95) employing the spread spectrum has been put into practical application in U.S.A., Hong Kong, Korea, and so forth. In this communication system, the application of the spread spectrum receiver by the MF is expected due to its advantages such as its high speed initial synchronization acquisition, flexibility of the path search for RAKE reception, and so forth. To put the spread spectrum receiver by the MF into practical use as the cellular mobile communication system, lower power consumption, smaller circuit scale and lower cost of production have been strongly required. Nonetheless, the de-spreading block using the MF is not free from the problems of the large circuit scale and large power consumption as described above.

The causes can be broadly divided into the following two. First, the conventional MF needs k stages (k=over-sampling ratio to a chip rate) of input sequence delay devices, one spreading code coefficient register and one multiplier per tap. For this reason, the circuit scale increases substantially proportionally to the number of taps. Second, because the processes from the delaying process of n stages (n=k (over-sampling ratio)×m (number of taps)) of input sequences to the multiply-add calculation of the input sequence and the spreading code sequence are collectively executed by one clock, a large number of gates operate simultaneously for each clock, and invite the increase of power consumption.

SUMMARY OF THE INVENTION

It is therefore an object of the present invention to provide a spread spectrum receiver which eliminates the problems of the prior art described above.

It is another object of the present invention to provide a spread spectrum receiver using a matched filter having a small circuit scale and low power consumption.

According to one aspect of the present invention, there is provided a spread spectrum receiver for de-spreading and demodulating reception signals (Rx(t)) subjected to spectrum spreading modulation, comprising:

m stages (where m is an integer of 2 to or more) of coefficient registers for storing the corresponding ones of spreading code coefficients of m chips from a spreading code sequence for de-spreading and demodulation;

m stages of taps, each for multiplying the spreading code coefficient stored in the corresponding ones of the m stages of the coefficient registers and the reception signal, and outputting the multiplication result;

m delay blocks so disposed as to correspond to the m stages of taps, for delaying the input by one chip and outputting a delay output;

m stages of adders, the adder of an ith stage (where i is any of 2 to m) from the second to the mth stages of the adders among the m stages of adders adding the multiplication result outputted from the tap of the ith stage and the addition result outputted from the adder of the (i−1)th stage, as a preceding stage of the ith stage, through the delay block of the corresponding (i−1)th stage and outputting the addition result, and the adder of the first stage adding the multiplication result outputted from the tap of the first stage and the addition result outputted from the adder of the last stage through the delay block of the corresponding last stage, and outputting the addition result; and a switch for outputting the addition result outputted from the delay block of the mth stage as the last stage among the m delay blocks as either one of the output as a correlation value and the input to the adder of the first stage among the m stages of adders.

To accomplish the reduction of the circuit scale and low power consumption as the object described above, the spread spectrum receiver according to the present invention sets the number of taps to a number smaller than the spread factor. When the number of taps is smaller than the spread factor, registers for storing the multiply-add calculation result of each tap become necessary and the number of gates increases. Therefore, the spread spectrum receiver according to the present invention executes the process of the addition block in common with the process of the cyclic accumulation block and furthermore, uses a register group disposed conventionally for the reception signals in common with the register group inside the integrated addition/cyclic accumulation block in order to prevent the increase of the number of registers.

Therefore, the spread spectrum receiver according to the present invention includes m stages of spreading code coefficient registers that are controlled by latch timing signals; multipliers for multiplying the reception signals of m taps by the spreading code; m adders, each for adding the multiplication result of each tap and the previous accumulation result; m×k registers for storing the accumulation results updated by the addition process by the adders; and a switch for controlling the timing for outputting a correlation value.

DESCRIPTION OF THE PREFERRED EMBODIMENTS

Next, preferred embodiments of a spread spectrum receiver according to preferred embodiments of the present invention will be explained with reference to the accompanying drawings.

In the embodiments of the invention which follows, the explanation will be given on a spread spectrum receiver which executes a de-spreading process of the reception signals which are sampled at a rate of four times (k=4) a chip rate, for example, in a spread spectrum communication system having a spread factor Gp=64, by way of example.

Figure 2:
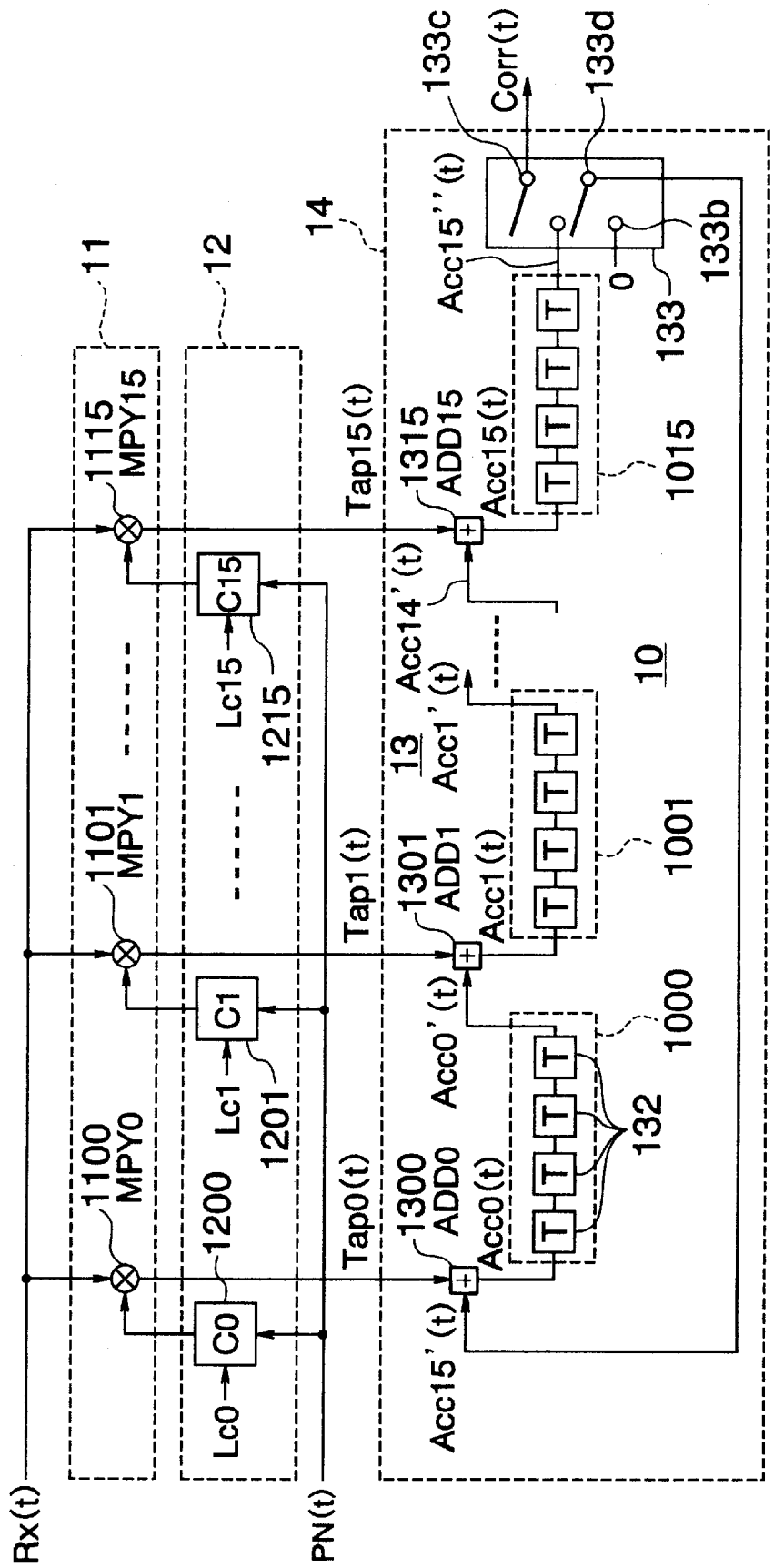
FIG. 2 is a block diagram showing a structural example of a spread spectrum receiver by a matched filter according to a first embodiment of the present invention.

FIG. 2 shows the arrangement of a spread spectrum receiver by a matched filter (MF) having the number of taps (stages of taps) m=16, for example, according to the first embodiment. The spread spectrum receiver according to this embodiment comprises a coefficient register block 12 for a spreading code, a multiplication block 11 and a cyclic accumulation block 14. The coefficient register block 12 for a spreading code records the spreading codes PN(t) in m stages (m=16, for example) of spreading code coefficient registers 1200 to 1215 that are controlled by latch timing signals Lci (i=0 to 15). Each multiplier 1100 to 1115 of the multiplication block 11 multiplies a reception signal Rx(t) and the content PN(t) of the corresponding coefficient register 1200 to 1215. The cyclic accumulation block 14 cyclicly accumulates Gp/m=4 times the multiplication result of each tap Tap 0(t) to Tap 15(t) and obtains a correlation value Corr(t) for one symbol. Hereinafter, the construction and operation of each block will be explained in detail with reference to the flow of the signals.

The reception signal Rx(t) that is over-sampled at a rate of four times, for example, the chip rate is inputted to the multiplier 1100 to 1115 (MPY0 to MPY15) of each tap.

On the other hand, the spreading code PN (t) is inputted to the spreading code coefficient register block 12. Each of these coefficient registers 1200 to 1215 (C0 to C15) reads the content of the spreading code PN(t) in accordance with a latch timing signal Lc0 to Lc15 determined for each register 1200 to 1215. Receiving the latch timing signal Lci (i=0 to 15), each register Ci reads the spreading code PN(t) and retains this spreading code until it receives the input of the next latch timing signal Lci+1. The latch timing signal Lci is generated by a latch timing signal generation circuit (not shown) which is so constituted as to generate a pulse for each of m×k (=64) operation clocks.

Figure 3:
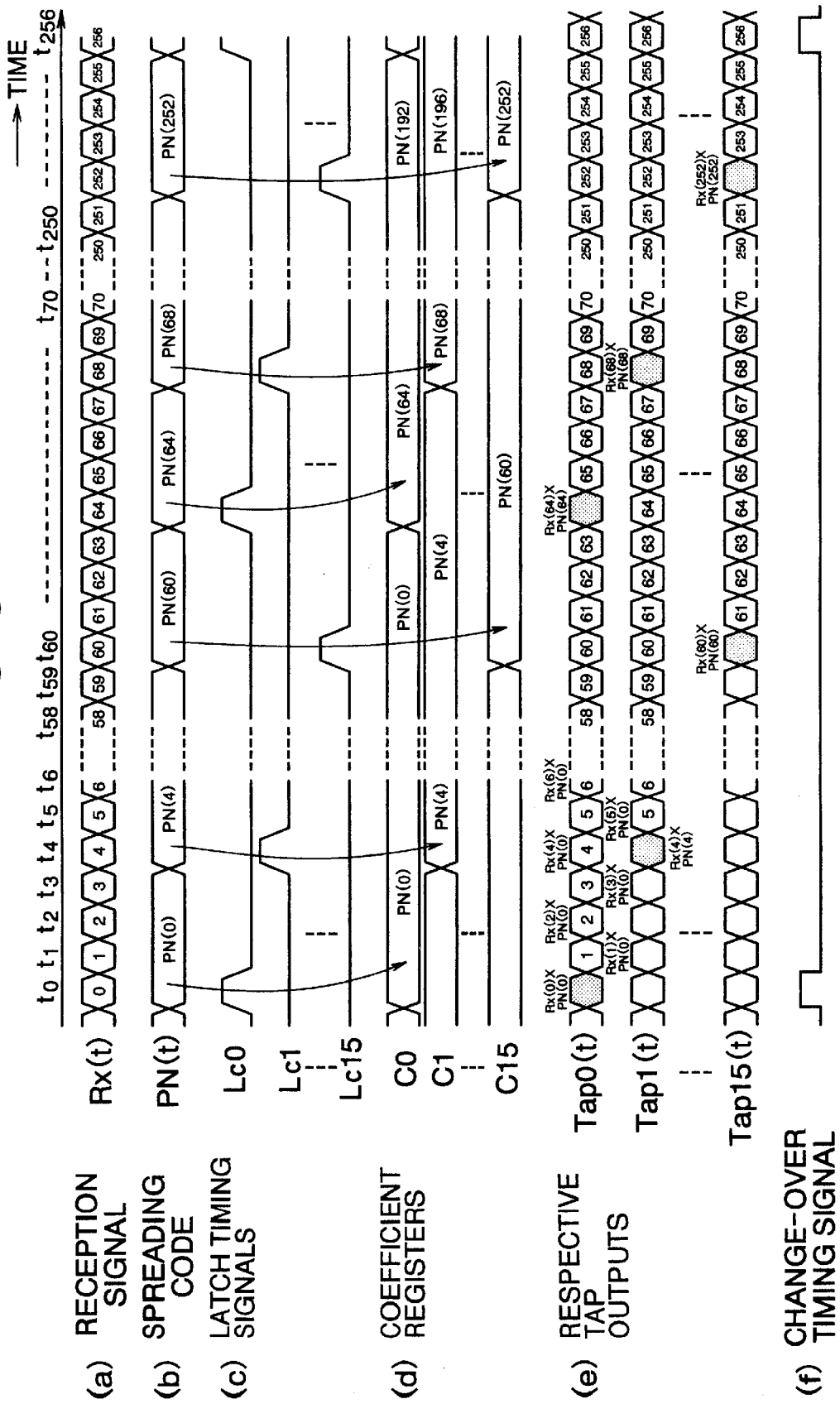
FIG. 3 is a timing chart showing operation timings of reception signals, a coefficient register inside a coefficient register block for a spreading code and each tap output in the first embodiment of the present invention.

FIG. 3 shows the operation timing of each coefficient register 1200 to 1215 in the spreading code coefficient register block 12. The spreading code PN(t) is a sequence of spreading codes PN(0), PN(4), PN(8), PN(12), . . . , of a chip rate which is 1/k (=¼) of the operation clock rate. FIG. 3 represents that the system starts its operation at a time t0 and PN(0) is inputted to the spreading code coefficient register block 12. As shown in FIG. 3, since pulses are generated at times t0, t', t128, . . . , for a latch timing signal Lco, the coefficient register C0 reads PN(0) at the time t0 and retains it till the time t63.

In the figure, tn represents a time point upon the lapse of n×(period of the operation clock) after the time point t0. Because the pulse of Lc0 is again inputted at the time t64, the coefficient register C0 reads PN(64) and retains it till the time t127. As to a latch timing signal Lc1, the pulses are generated similarly at the times t4, t68, t132, . . . , and as to the latch timing signal Lc15, pulses are likewise generated at the times t60, t124, t188, . . . , and the content of each coefficient register C0 to 15 is as follows:

from t0 to t63: C0=PN(0)
from t4 to t67: C1=PN(4) . . .
from t60 to t123: C15=PN(60)
from t64 to t127: C0=PN(64) . . .

As listed above, the adjacent coefficient registers store the spreading codes that are deviated by one sequence from one another.

Each multiplier 1100 to 1115 of the multiplication block 11 multiplies the content of the reception signal Rx(t) by the content of the corresponding one of the coefficient registers Ci (i=0 to 15) as described already, and outputs any of Tap0(t) to Tap15(t) to the corresponding tap. In other words, as shown in FIG. 3, the result of multiplication of the reception signal and the coefficient at each tap is as follows:

from t0 to t63: Tap0(t)=Rx(t)×PN(0)
from t4 to t67: Tap1(t)=Rx(t)×PN(4)
from t60 to t123: Tap15(t)=Rx(t)×PN(60)
from t64 to t127: Tap0(t)=Rx(t)×PN(64)

As listed above, the coefficient register C15 of the coefficient register block 12 for the spreading code reads PN(60) at the time t60 and all the coefficient registers C0 to 15 read the spreading codes. In consequence, the multiplication result is outputted at the time t>t60 from all of Tap0 to 15. Incidentally, it is also possible to employ the construction in which, if the spreading code coefficient is 0 in this multiplication, the value of the coefficient register is as such outputted as the multiplication result from the tap and if the spreading code coefficient is 1, the value obtained by reversing the code of the value of the coefficient register is outputted as the multiplication result from the tap.

As shown in FIG. 2, the cyclic accumulation block 14 comprises an accumulation sub-register block 1000 to 1015 disposed for each tap, an adder 13 (1300 to 1315: ADD0 to 15) for cyclicly accumulating the multiplication result Tap0(t) to Tap15(t) for each tap and a switch 133 for controlling the timing at which the output from the accumulation sub-register block 1015 of the last stage is outputted as a correlation value of the de-spread demodulation result.

Each of the adders ADD0 to 15 executes the addition process of the corresponding one of the multiplication results Tap0(t) to Tap15(t) outputted from the corresponding tap and the accumulation result output ACC0'(t) to ACC15'(t) from the accumulation sub-register block of the previous stage corresponding thereto.

at ADD0: ACC0(t)=Tap0(t)+ACC15'(t)
at ADD1: ACC1(t)=Tap1(t)+ACC0'(t)
at ADD2: ACC2(t)=Tap2(t)+ACC1'(t) . . .
at ADD15: ACC15(t)=Tap15(t)+ACC14'(t).

The accumulation result from each adder is updated in this manner and is inputted to the corresponding accumulation sub-register block. Incidentally, ACCi(t) (i=0 to 15) and ACCi'(t) represent the input and the output to and from the accumulation sub-register block i, respectively.

The output ACCi(t) from each adder ADDi (i=0 to 15) is inputted to the corresponding accumulation sub-register block i, is delayed by four operation clocks by memories such as shift registers 132, that are cascaded in k (k=4) stages and constitute this register block, and is outputted as ACCi'(t) (i=0 to 15). Therefore, the following relationship is established:

$$ACCi'(t)=ACCi(t-4)$$

The operation of the cyclic accumulation block 14 will be explained. Referring to FIG. 3, when the system starts operating at the time t0, the relation Tap0(0)=Rx(0)×PN(0) is established as described already, and since ACC'15(0)=0, the result of operation of the adder ADD0 is as follows:

$$ACC0(0)=\text{Tap}0(0)+ACC'15(0)=Rx(0)\times PN(0)$$

and this is recorded in the shift register of the initial stage of the accumulation sub-register block 1000. This signal ACC0 is inputted as ACC0'(4) at the time t4 to the adder ADD1 and is added to Tap1(4). Since Tap1(4)=Rx(4)×PN(4), the signal ACC1(4) satisfies the relation ACC1(4)=Rx(0)×PN(0)+Rx(4)×PN(4). In this way, the accumulation process is serially executed for the signal starting the de-spread demodulation process for the reception signal Rx(0) received at the time t0 by PN(0), and the process shifts to the accumulation sub-register 1015 at the time t60. That is:

$$ACC15(60)=Rx(0)\times PN(0)+Rx(4)\times PN(4)+ \ldots +Rx(60)\times PN(60)$$

The partial accumulation result ACC15(60) is recurrently inputted as ACC15'(64) (=ACC15"(64)) to the adder ADD0 at the time t64 and is added to Tap0(64). Because the resister C0 is updated to PN(64) at the time t64 as described above, the partial accumulation result is updated in the following way:

$$ACC0(64)=Rx(64) \times PN(64)+ACC15(60)=Rx(0) \times PN(0)+Rx(4) \times PN(4)+ \ldots +Rx(64) \times PN(64)$$

The signal starting the de-spread demodulation process for the reception signal Rx(0) by PN(0) at the time t0 cyclicly passes four times (Gp/m=4) through the accumulation sub-regulator blocks 1000 to 1015 comprising m=16 sets, and the accumulation process is executed. This corresponds to the operation in which the black signals are serially accumulated among the signals Tap0(t) to Tap15(t) represented as "each tap output" in FIG. 3(e).

Therefore, at the time t256, $$ACC15"(256)=Rx(0) \times PN(0)+Rx(4) \times PN(4)+ \ldots +Rx(252) \times PN(252)$$

The correlation value for one symbol can be obtained in this way. This value is outputted as Corr(256) from the switch 133.

The output timing control switch 133 connects the accumulation sub-register 1015 of the last stage and the accumulation sub-register 1000 of the initial stage in the feedback connection so that the output ACC15"(t) of the accumulation sub-register block 1015 can be inputted as ACC15'(t) to the accumulation sub-register block 1300. As described above, however, the switch is set to that it outputs ACC15"(t) as the correlation value Corr(t) of the de-spread demodulation result and at the same time, outputs 0 for ACC15'(t) at the time at which ACC15"(t) reaches the correlation value for one symbol (for example, the period from t256 to t319, from t512 to t575, t256, etc.). In this way, while the correlation value for one symbol is being outputted, feedback between the accumulation sub-register 1015 of the last stage and the accumulation sub-register 1000 of the initial stage is released and the partial accumulation result used for the de-spread demodulation process of the next symbol is reset.

Therefore, as shown in FIG. 3(f), the change-over timing signal generated by a change-over timing signal generation circuit, not shown, is applied to the switch 133 in synchronism with the operation clock at the time at which ACC15" (t) attains the correlation value of one symbol, such as the time t(0), t(256), etc. In consequence, the input terminals 133a and 133b of the switch 133 are changed over to the output terminals 133c and 133d, respectively, at the time at which ACC15"(t) attains the correlation value for one symbol, such as the time t(0), t(256), etc. and the input terminal 133a is again returned to the output terminal 133d at the time t(1), t(257), etc.

In this manner, the switch 133 inputs the addition result which is outputted from the adder ADD15 of the last stage through the delay element 1015 of the last stage and delayed by k operation clocks to the adder ADD0 of the first stage in a time range of t0 to tGpxk−1, and outputs as a correlation value the addition result which is outputted from the adder ADD15 through the delay element 1015 and delayed by the k operation clocks in a time range of tGpxk to tGpx(k+1)−1, where t0 represents a time point where the receiver starts its operation, tGpxk−1 represents a time point upon lapse of (Gpxk−1)×(period of the operation clock) after the time point t0, tGpx(k+1)−1 represents a time point upon lapse of (Gpx(k+1)−1)×(period of the operation clock) after the time point t0.

By the construction and the operations described above, the spread spectrum receiver using the MF according to this embodiment can obtain the correlation value by the de-spread process of the reception signal at the timings deviated mutually by one sampling clock.

Next, the spread spectrum receiver by the MF, which decreases the number of operation gates, according to the second embodiment of the present invention will be explained. The second embodiment is different from the first embodiment in only the construction and the operation of the cyclic accumulation block, and the explanation will be given on the case of the tap number m=16 in the same way as in the first embodiment.

Figure 4:
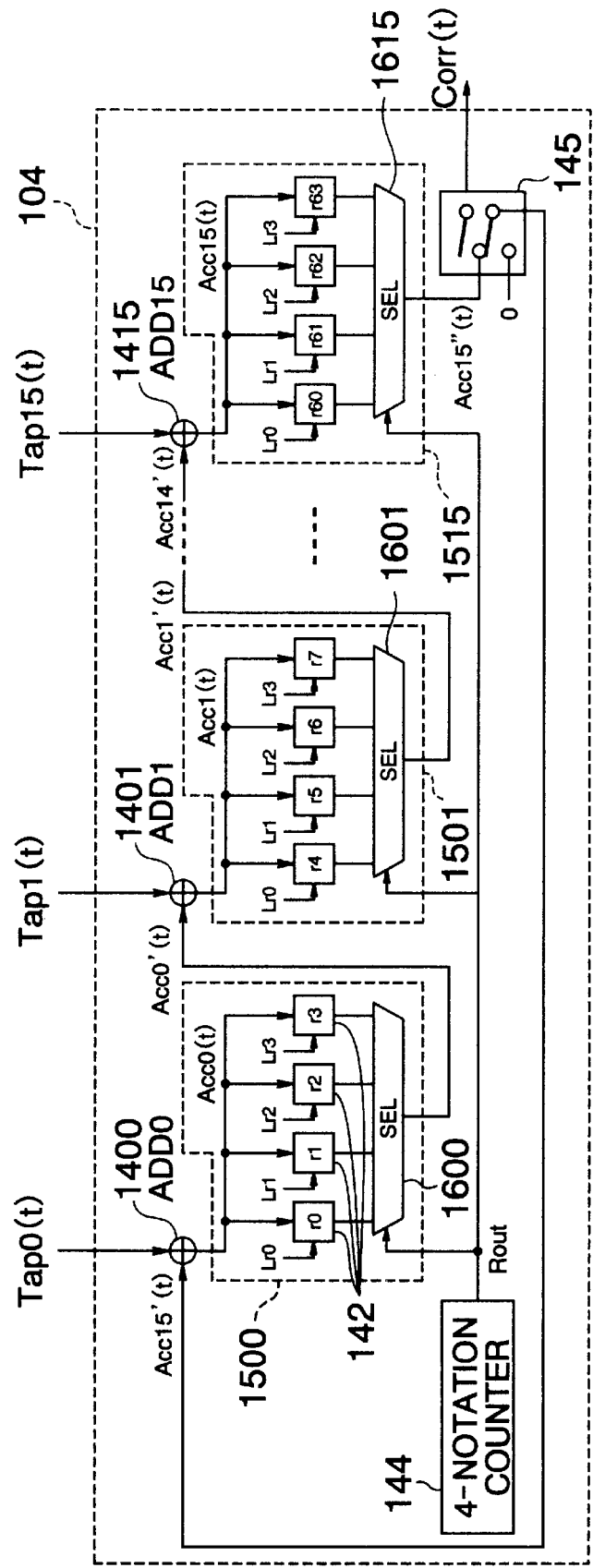
FIG. 4 is a block diagram showing a structural example of a cyclic accumulation block of a spread spectrum receiver by a matched filter according to the second embodiment of the present invention.

FIG. 4 shows the construction of the cyclic accumulation block of the spread spectrum receiver using the MF according to the second embodiment. In this embodiment, the multiplication block and the spreading code coefficient register block 29 are the same as those of the first embodiment shown in FIG. 2, and their illustration and explanation will be omitted.

The cyclic accumulation block 104 comprises an accumulation sub-register block 1500 to 1515 so disposed as to correspond to each tap Tap0(t) to Tap15(t), a k-notation (k=4) counter 144 for controlling the output timing of each accumulation sub-register block, an adder 1400 to 1415 for cyclicly accumulating the multiplication result Tap0(t) to Tap15(t) for each tap, and a switch 145 for controlling a timing of outputting the output from the accumulation register block 1515 of the last stage as the correlation value of the de-spread demodulation result.

The functions of the input/output signals Tapi(t), ACC(i−1)(t), ACCi(t) in each adder 1400 to 1415 (ADD0 to ADD15) and the output timing control switch 145 in FIG. 4 are the same as those of the first embodiment of the present invention. Therefore, only the construction of each accumulation sub-register block (1500 to 1515) and its operation will be hereby explained.

Each accumulation register block i (i=0 to 15) comprises k (=4) register 142 and a selector 143 which selects one of these registers and outputs its retention value to the adder ADD (i+1). The adder ADDi adds the output of the accumulation resister block of the previous stage (accumulation register block of the last stage when i=0) and the corresponding multiplication result Tapi. Each of the registers r0 to r63 reads the output ACC0(t) to ACC15(t) from the adder 1400 to 1415 in response to the corresponding one of the latch timing signals Lr0 to Lr3 determined for each register. Receiving the input of the latch timing signal Lr, the register rj (j=0 to 63) reads the output from the corresponding adder and retains the output until it receives the input of the next timing signal Lr. The operation timing of each register rj in the cyclic accumulation block 104 is shown in FIG. 5.

Figure 5:
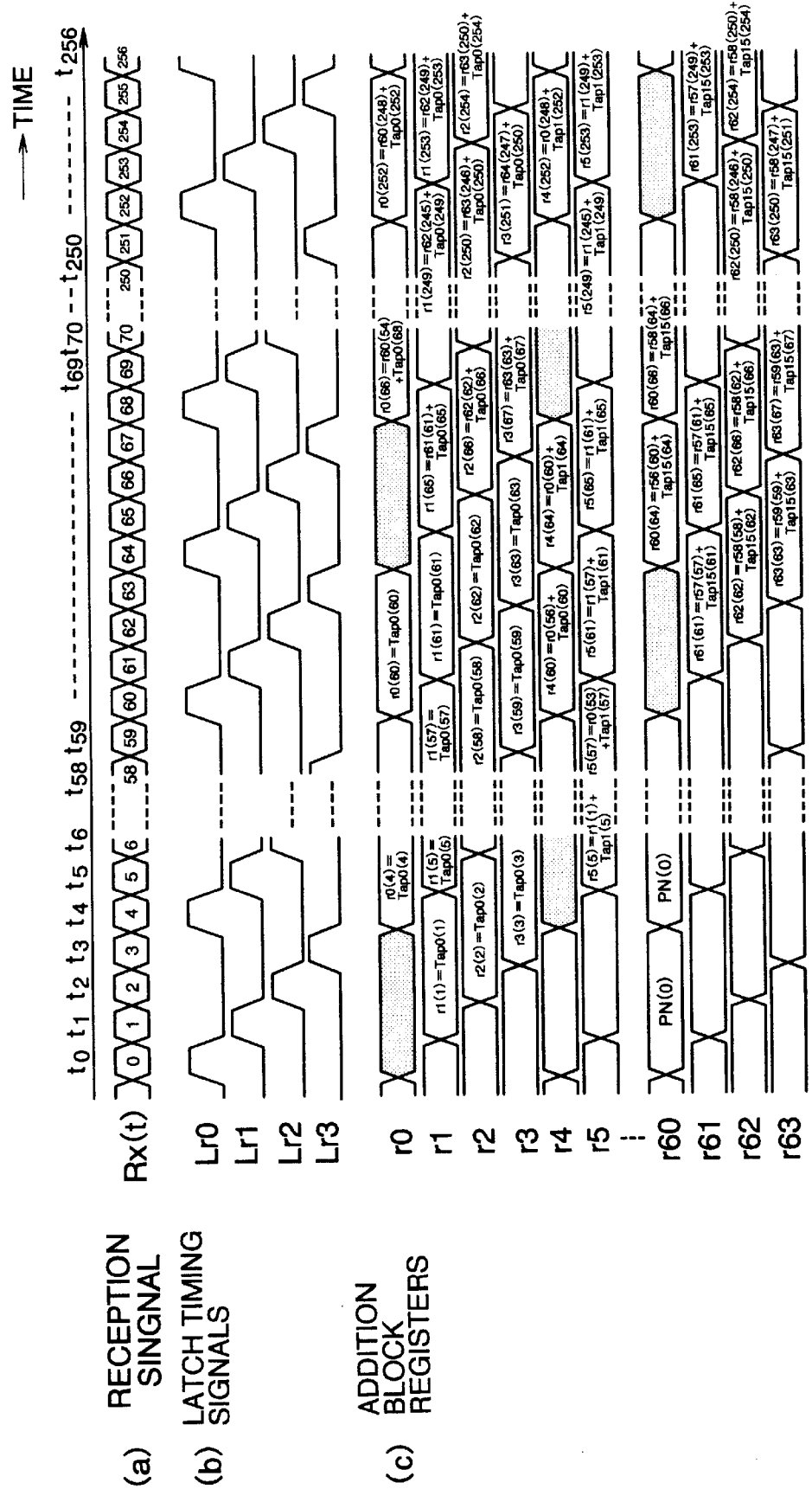
FIG. 5 is a timing chart showing operation timings of an accumulation register inside the cyclic accumulation block in the second embodiment of the present invention.

As shows in FIG. 5, one pulse is generated for k (k=4) operation clock for the latch timing signals, and the pulses Lr0, Lr1, Lr2 and Lr3 are deviated by one operation clock from one another. Therefore, assuming that the system starts operating at the time t=0, the content of each register 142 is as follows:

$r0(t)=ADD0(4 \times [t/4])$ $r1(t)=ACC0(4 \times [t/4]+1)$ $r2(t)=ACC0(4 \times [t/4]+2)$ $r3(t)=ACC0(4 \times [t/4]+3)$ $r4(t)=ACC1(4 \times [t/4])$ $r5(t)=ACC1(4 \times [t/4]+1) \ldots$ That is, $$rj(t)=ACC[j/4](4\times[t/4]=[t\ 4])$$

with the proviso that j=0 to 63, the operation [x/y] represents an integer portion of the quotient of the division result of an integer x by an integer y, and the operation [x % y] represents the remainder of the quotient of the division result of the integer x by the integer y.

Each selector 1600 to 1615 selects one of the four registers 142, that are connected serially and cyclicly (in the order of r0, r1, r2, r3, r0, r1, . . . , in the accumulation sub-register block 1500 of the initial stage, for example) for each operation clock, in accordance with the accumulation sub-register block output control signal Tout generated from the k-notation (k=4) counter 144, and outputs the content of the selected register as an accumulation sub-register block output ACC1'(t) (i 0 to 15). As this time, the latch timing signal Lr for reading the accumulation result ACCi to each register 142 and the output control signal Rout are synchronized with each other, and the content accumulated by the adder 141 is in synchronism with the chip timing of the spreading code. In other words, when the accumulation sub-register block 1500 outputs the content of the register r0 as ACC0'(t), for example, the accumulation content ACC1(t) by the adder ADD1 is read into the register r4. Similarly, those registers rj having an equal [j % 4] have the correspondence relationship as a set that operates simultaneously. This mode is shown in FIG. 5. However, because the coefficient register exists to which no spreading code is inputted from the start of the operation of the system at the time t=0 to t<60, the cyclic accumulation process is executed with this Tapi(t) being 0.

Therefore, the signals starting the de-spread demodulation process for Rx(0) at PN(0) are serially accumulated till the time t2 and reach the correlation value for one symbol as represented by black signals in FIG. 5 and are outputted as the Corr(256) at the time t256 through the output timing control switch 145.

In this manner, the switch 145 inputs the addition result which is outputted from the adder ADD15 of the last stage through the delay element 1515 of the last stage and delayed by k operation clocks to the adder ADD0 of the first stage in a time range of t0 to tGpxk−1, and outputs as a correlation value the addition result which is outputted from the adder ADD15 through the delay element 1515 and delayed by the k operation clocks in a time range of tGpxk to tGpx(k+1)−1, where t0 represents a time point where the receiver starts its operation, tGpxk−1 represents a time point upon lapse of (Gpxk−1)×(period of the operation clock) after the time point t0, tGpx(k+1)−1 represents a time point upon lapse of (Gpx(k+1)−1)×(period of the operation clock) after the time point t0.

By the construction and the operation described above, the spread spectrum receiver by the MF according to the second embodiment does not shift the partial accumulation result in the cyclic accumulation block and consequently, can reduce the number of the operation gates. In other words, since each register inside the cyclic accumulation block 104 shown in FIG. 4 operates once per k operation clock, lower power consumption can be achieved than in the first embodiment.

Incidentally, the sampling rate of the reception signals in the embodiment shown in FIG. 4 is four times (k=4) the chip rate but when k=1, the number of the registers inside the cyclic accumulation block is equal to the number of taps (m=n). In this case, because each accumulation sub-register block, the selector 1600 to 1615 and the counter 144 become unnecessary. In this case, further, the sampling time D is D=T (time width of one chip).

The circuit scale of the spread spectrum receiver by the MF according to the second embodiment and its power consumption will be explained in comparison with those of the spread spectrum receiver by the MF shown as a prior art example in FIG. 1.

In the MF in the present invention, the number of taps is set to a number smaller than the spread factor. When the tap number is simply reduced, the circuit scale decreases substantially in proportion to the tap number, but a circuit (cyclic accumulation block) becomes necessary for accumulating Gp/m times the partial correlation values obtained by the m-tap MF because the correlation value for one symbol is determined. In consequence, the circuit scale at this portion increases. The present invention limits the increase of the circuit scale to minimum by constituting the cyclic accumulation block in common with the input sequence registers and with the adders.

Figure 1:
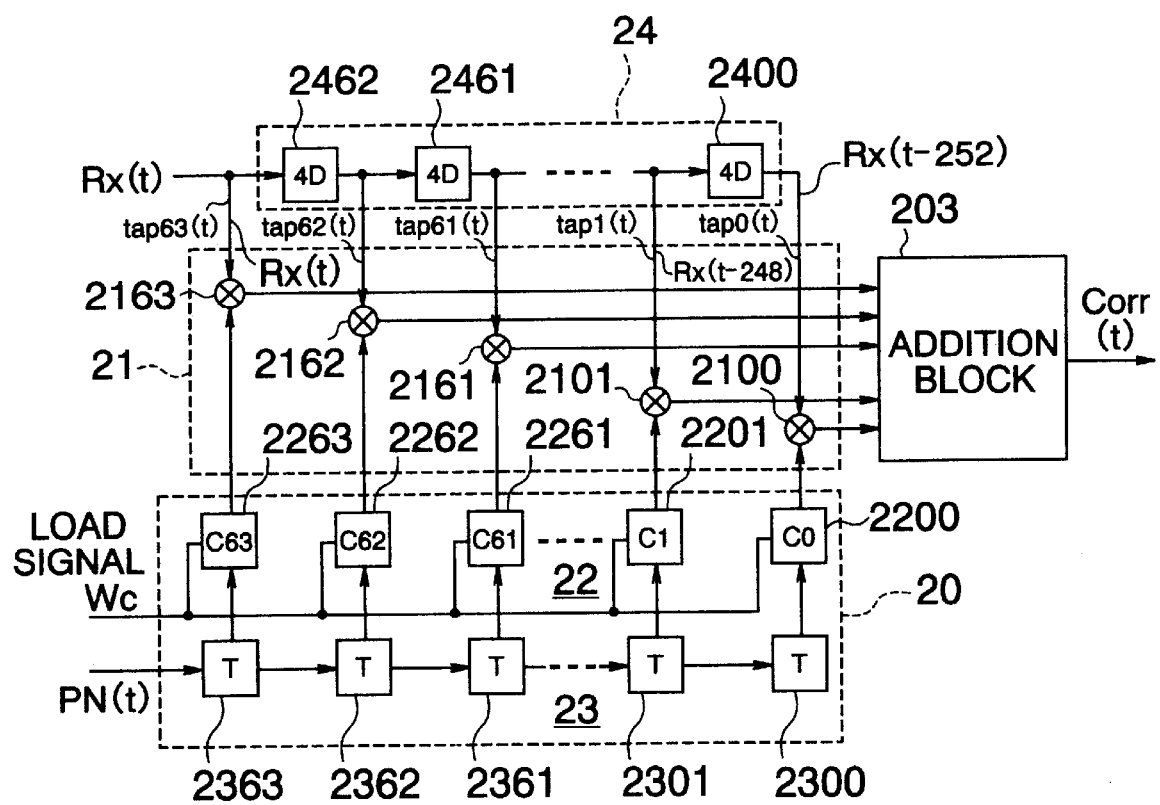
FIG. 1 is a block diagram showing a structural example of a spread spectrum receiver by a matched filter according to the prior art.

The coefficient register block for the spreading code by the MF according to the present invention shown in FIG. 2 does not require the shift registers in comparison with FIG. 1. Further, the number of registers is proportional to the number of taps. For this reason, the circuit scale of the coefficient register block of the system according to the present invention is about 8% of the conventional system.

Since the construction of the individual multipliers is equal to one another in the multiplication block, its circuit scale is proportional to the number of multipliers. Since the number of multipliers corresponds to the number of taps, the circuit scale of the multiplication block of the system according to the present invention is ¼ of the conventional system.

The cyclic accumulation block according to the present invention can be believed as a block that executes the process for integrating the register group for the input signals and the addition block in the conventional system. Therefore, the circuit scale will be compared with the sum of the input sequence register group, the addition block and the cyclic accumulation block. The register and the selector of the cyclic accumulation block according to the present invention have a greater number of bits than that of the input sequence registers of the conventional system, and the individual circuits become greater but the number of registers is decreased because the number of taps is reduced. As to the adder, the individual construction is equal and the circuit scale is proportional to the number of taps. As a result, the circuit scale of the cyclic accumulation block of the system of the present invention is about 50% of the conventional system, and it can be appreciated that the reduction of the circuit scale by the reduction of the number of taps is more effective than the increase of the number of bits.

Taken altogether, the overall circuit scale of the MF according to the present invention shown in FIG. 2 can be reduced to about 40% of the circuit scale of the conventional system shown in FIG. 1.

In comparison with the conventional system, the relationship between the number of taps and the circuit scale of the MF according to the present invention can effectively reduce the circuit scale such as about 85% at 32 taps, about 40% at 16 taps, about 20% at 8 taps and about 10% at 4 taps.

As to power consumption, the present invention provides a great effect of reducing the circuit scale by the reduction of the number of taps and by using the cyclic accumulation block and the addition block in common with each other. The present system employs the registers for the spreading codes and the registers for accumulation so as to reduce the number of gates operating for each operation clock and to achieve low power consumption. As a result, power consumption of the overall MF according to the present invention shown in FIG. 2 can be reduced to about 25% of the conventional system shown in FIG. 1.

The present invention is applicable to the case where the number (stages) m of the taps is 2 or more, and further to the case where the over-sample ratio k is 1 or more.

As to the relationship between the number of taps and consumed power in the MF, further, the present invention can effectively reduce power consumption to about 50% at 32 taps, about 25% at 16 taps, about 10% at 8 taps and about 5% at 4 taps in comparison with the conventional system.

The present invention sets the number of taps to a number smaller than the spread factor and executes the cyclic accumulation process for obtaining the correlation value for one symbol by the circuit construction constituted by using the input sequence register block and the addition block in common with each other in the conventional system. Therefore, the present invention can achieve the spread spectrum receiver by the MF having a smaller circuit scale.

According to the construction described above, the present invention can accomplish the accumulation process, which becomes afresh necessary in most cases when the number of taps is reduced, by utilizing the constituent circuits that constitute the conventional MF without increasing the circuit scale. As a result, the overall circuit scale can be effectively reduced irrespective of the relationship between the number of taps and the spread factor.

In addition to the reduced basic circuit construction described above, the present invention employs the construction in which the accumulation register in the cyclic accumulation block reads once per k clock the partial accumulation result, and can thus reduce the number of operation gates. Therefore, the present invention can achieve the spread spectrum receiver capable of reducing power consumption.

What is claimed is:

1. A spread spectrum receiver for de-spreading reception signals subjected to spectrum spreading and modulation, comprising:

m stages of coefficient registers (where m is an integer of 2 or more), each storing corresponding one of spreading code coefficients of m chips from a spreading code sequence for de-spreading;

m stages of taps, each multiplying the spreading code coefficient stored in corresponding one of said m stages of said coefficient registers by the reception signal to obtain a multiplication result, and outputting the multiplication result;

m stages of delay elements provided in one-to-one correspondence to said m stages of taps, respectively, each for delaying an input by one chip and outputting an output signal;

m stages of adders, said adder of an i-th stage (where i is an arbitrary one of integers of 2 to m) among second to m-th stages of said m stages of adders adding a multiplication result outputted from said tap of an i-th stage to an addition result outputted from said adder of an (i−1)-th stage through said delay element of a corresponding (i−1)-th stage to obtain an addition result and outputting the addition result, and said adder of a first stage adding a multiplication result outputted from said tap of the first stage to an addition result of said adder of the m-th stage through said delay element of the corresponding m-th stage and outputting an addition result; and a switch for outputting the addition result outputted from said delay element of the m-th stage among said m stages of said delay elements as either one of an output as a correlation value or an input to said adder of the first stage among said m stages of said adders.

2. A spread spectrum receiver according to claim 1, wherein said spreading code coefficient is a value of 0 or 1, and each of said taps outputs a value of the reception signal when said spreading code coefficient stored in a corresponding one of said m stages of coefficient registers is 0, and outputs a value obtained by reversing a code of the reception signal when said spreading code coefficient stored in the corresponding one of said m stages of coefficient registers is 1.

3. A spread spectrum receiver according to claim 1, where said switch inputs the addition result which is outputted from said adder of said m-th stage through said delay element of said m-th stage and delayed by k operation clocks to said adder of the first stage in a time range of t0 to tGpxk−1, and outputs as a correlation value the addition result which is outputted from said adder of said m-th stage through said delay element of said m-th stage and delayed by the k operation clocks in a time range of tGpxk to tGpx(k+1)−1, where t0 represents a time point where said receiver starts its operation, tGpxk−1 represents a time point upon lapse of (Gpxk−1)×(period of the operation clock) after the time point t0, tGpx(k+1)−1 represents a time point upon lapse of (Gpx(k+1)−1)×(period of the operation clock) after the time point t0 and where k is an integer of one or more and the reception signal is subjected to spectrum spreading and modulation at a spread factor Gp.

4. A spread spectrum receiver for de-spreading reception signals subjected to spectrum spreading and modulation at a spread factor Gp by sampling the reception signals by operation clocks k times a chip rate, where k is an integer of one or more, comprising:

a first signal line for inputting the reception signals;

a second signal line for inputting a spreading code sequence for de-spreading;

m stages of coefficient registers, m is an integer of 2 or more, the coefficient register of an i"-th stage (where i" is an arbitrary one of integers of 1 to m) among said m stages of said coefficient registers storing the spreading code sequence from said second signal line in accordance with a latch timing signal generated at every k×m operation clocks after a time point t{(i−1)×k}, where t((i−1)×K) represents a time point upon lapse of (Gpxk−1) X (period of the operation clock) after a time point where said receiver starts its operation;

m stages of taps, each multiplying the spreading coefficient stored in said coefficient register of the corresponding one of said m stages of said coefficient registers by the reception signal from said first signal line to obtain a multiplication result, and outputting the multiplication result;

m stages of delay elements provided in one-to-one correspondence to said m stages of said taps, respectively, each for delaying an input by k operation clocks and outputting a delay signal;

m stages of adders, said adder of an i'-th stage among second to m-th stages of said adders among said m stages of said adders adding a multiplication result outputted from said tap of an i'th stage (where i' is the corresponding one of integers of 2 to m) to an addition result outputted from said adder of an (i'−1)-th stage as a previous stage of said i'-th stage through said delay element of a corresponding (i'−1)-th stage to obtain an addition result, outputting the addition result, and said adder of a first stage adding a multiplication result outputted from said tap of the first stage to an addition result outputted from said adder of the m-th stage through said delay element of the corresponding m-th stage, and outputting an addition result; and a switch for outputting the addition result outputted from said delay element of said m-th stage as the last stage as either one of an output as a correlation value or an input to said adder of the first stage among said m stages of adders.

5. A spread spectrum receiver according to claim 4, wherein said switch inputs the addition result which is outputted from said adder of said m-th stage through said delay element of said m-th stage and delayed by k operation clocks to said adder of the first stage in a time range of t0 to tGpxk−1, and outputs as a correlation value the addition result which is outputted from said adder of said m-th stage through said delay element of said m-th stage and delayed by the k operation clocks in a time range of tGpxk to tGpx(k+1)−1, where t0 represents a time point where said receiver starts its operation, tGpxk−1 represents a time point upon lapse of (Gpxk−1)×(period of the operation clock) after the time point t0, tGpx(k+1)−1 represents a time point upon lapse of (Gpx(k+1)−1)×(period of the operation clock) after the time point t0.

6. A spread spectrum receiver according to claim 4, wherein:

the reception signals are sampled at a rate k times the chip rate;

each of said delay elements of the first to (m−1)-th stages among said m stages of delay elements includes k accumulation registers of an i-th stage (where i is an arbitrary one of integers of 1 to m−1) for inputting serially and cyclicly an addition result outputted from said adder of the i-th stage as a corresponding one of said adders of the first to (m−1)-th stages, and a selector of an i-th stage for selecting cyclicly one of said k accumulation registers and inputting an addition result stored in the selected one of said accumulation registers to said adder of the (i+1)-th stage as a next adder of said adder of said i-th stage; and wherein said delay element of the m-th stage among said m stages of said delay elements includes k accumulation registers of the m-th stage for inputting serially and cyclicly an addition result outputted from said adder of the corresponding m-th stage among said m stages of said delay elements, and a selector of the m-th stage for cyclicly selecting one of said k accumulation registers of the m-th stage and applying an addition result stored in the selected one of said accumulation registers to said switch.

7. A spread spectrum receiver according to claim 4, wherein:

said spreading code coefficient is a value of 0 or 1, and each of said taps outputs a value of the reception signal when said spreading code coefficient stored in a corresponding one of said m stages of coefficient registers is 0, and outputs a value obtained by reversing a code of the value of the reception signal when said spreading code coefficient stored in the corresponding one of said m stages of coefficient registers is 1.

8. A spread spectrum receiver for de-spreading reception signals subjected to spectrum spreading and modulation at a spread factor Gp by sampling the reception signals by operation clocks at a rate k times a chip rate, where k is an integer of one or more, comprising:

m stages of coefficient registers (where m is an integer of 2 or more, and m<Gp) each for storing corresponding one of spreading code coefficients of m chips from a spreading code sequence for de-spreading, respectively;

m stages of taps, each multiplying the spreading code coefficient stored in corresponding one of said m stages of said coefficient registers by the reception signal to obtain a multiplication result, and outputting the multiplication result;

m stages of delay elements provided in one-to-one correspondence to said m stages of said taps, each for delaying an input by k operation clocks and outputting an output signal;

m stages of cyclic addition blocks, said cyclic addition block of an i-th stage (where i' is an arbitrary one of 2 to m) from second to m-th stages of said cyclic addition blocks among said m stages of said addition blocks adding a multiplication result outputted from said tap of an i'-th stage as a corresponding one of the second to m-th stages to the addition result outputted from said cyclic addition block of an (i'−1)-th stage as a previous stage of said cyclic addition block of said i'-th stage through said delay element of an (i'−1)-th stage to obtain addition result and outputting the addition result, and said cyclic addition block of a first stage adding a multiplication result outputted from said tap of the first stage to the addition result outputted from said cyclic addition block of the m-th stage through said delay element of the corresponding m-th stage to obtain and outputting an addition result; and a switch for outputting the addition result outputted from said delay element of the m-th stage among said m stages of said delay elements as either one of an output as a correlation value or an input to said adder of the first stage among said m stages of said adders.

9. A spread spectrum receiver according to claim 8, wherein said switch inputs the addition result which is outputted from said addition block of said m-th stage through said delay element of said m-th stage and delayed by the k operation clock to said addition block of said first stage in a time range of t0 to tGpxk−1, and outputs as a correlation value the addition result which is outputted from said addition block of said m-th stage and delayed by the k operation clocks in a time range of tGpxk to tGpx(k+1)−1, where t0 represents a time point where said receiver starts its operation, tGpxk−1 represents a time point upon lapse of (Gpxk−1)×(period of the operation clock) after the time point t0, tGpx(k+1)−1 represents a time point upon lapse of (Gpx(k +1)−1)×(period of the operation clock) after the time point t0.

10. A spread spectrum receiver according to claim 8, wherein:

the reception signal is sampled at a rate k times the chip rate;

each of said delay elements of said first to (m−1)-th stages among said m stages of said delay elements includes:

k accumulation registers of an i-th stage (where i is an arbitrary one of 1 to m−1) for inputting serially and cyclicly an addition result outputted from said adder of said i-th stage as a corresponding one of said adders of said first to said (m−1)-th stages; and a selector of an i-th stage for cyclicly selecting one of said k accumulation registers and inputting an addition result stored in the selected one of said accumulation registers to said adder of an (i+1)-th stage as the next stage of said i-th stage; and said delay element of the m-th stage among said m stages of said delay elements includes:
- k accumulation registers of the m-th stage for inputting serially and cyclicly the addition result outputted from said adder of the corresponding m-th stage, and
- a selector of the m-th stage for selecting cyclicly one of said k accumulation registers of the m-th stage and applying an addition result stored in said accumulation register thus selected to said switch.

11. A spread spectrum receiver according to claim 8, wherein:

said spreading code coefficient is a value of 0 or 1, and each of said taps outputs a value of the reception signal when said spreading code coefficient stored in a corresponding one of said m stages of coefficient registers is 0, and outputs a value obtained by reversing a code of the value of the reception signal when said spreading code coefficient stored in the corresponding one of said m stages of coefficient registers is 1.

* * * * *